No. 790,034. PATENTED MAY 16, 1905.
O. H. DAVISON.
MANHOLE COVER.
APPLICATION FILED JAN. 15, 1904.

Witnesses:
Rudow Rummler
Glen C. Stephens

Inventor,
Orin H. Davison,
by Rummler & Rummler
Attorneys.

No. 790,034. Patented May 16, 1905.

UNITED STATES PATENT OFFICE.

ORIN H. DAVISON, OF CHICAGO, ILLINOIS.

MANHOLE-COVER.

SPECIFICATION forming part of Letters Patent No. 790,034, dated May 16, 1905.

Application filed January 15, 1904. Serial No. 189,172.

*To all whom it may concern:*

Be it known that I, ORIN H. DAVISON, a citizen of the United States of America, and a resident of Chicago, in the county of Cook and State of Illinois, have invented certain new and useful Improvements in Manhole-Covers, of which the following is a specification.

The main object of my invention is to provide an improved form of locking device for securing the cover-plates upon manholes leading to underground areaways, &c. I accomplish this object by the device shown in the accompanying drawings, in which—

Figure 1:
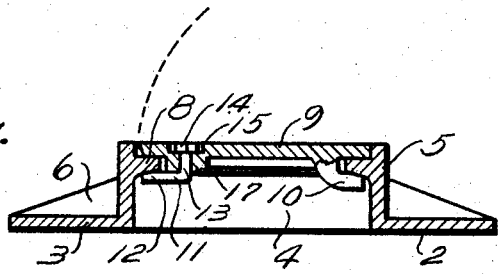
Figure 2:
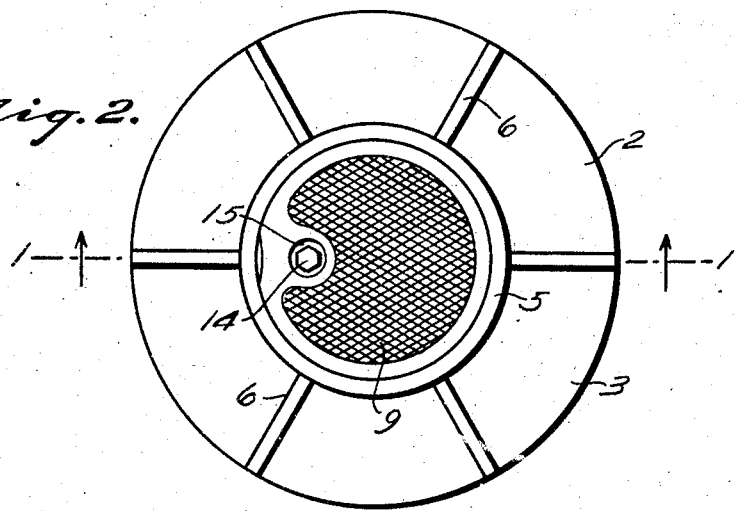
Figure 3:
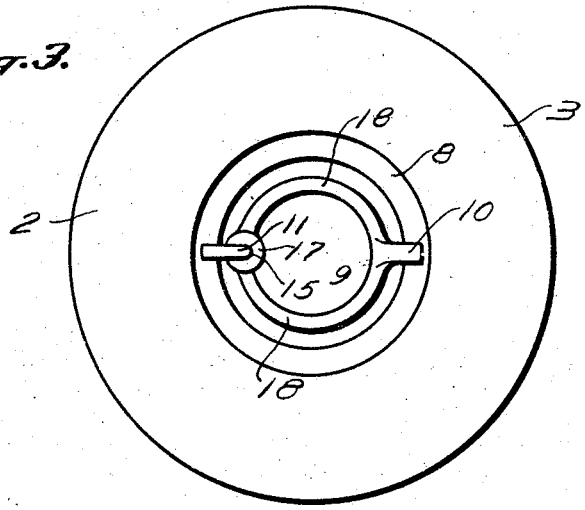

Figure 1 is a vertical section of a manhole-cover constructed according to my invention. Fig. 2 is a top plan of the same. Fig. 3 is a bottom plan of the same.

In the construction shown the cover consists of a circular frame 2, having a flat base 3, with a central aperture 4 through same. The edges of the aperture 4 are surrounded by a vertical wall 5, stiffened by web-shaped braces 6. An annular shoulder 8 projects inwardly of the aperture 4 and extends around the wall 5 near the top of same. The aperture 4 is closed by means of a cover-plate 9, which fits flush with the upper edge of the wall 5 and rests upon the shoulder 8, as shown in Fig. 1. A finger 10 is cast solid upon the cover-plate 9 at one side of same, and extends downwardly and outwardly, so as to bear on the under side of the shoulder 8 when the cover-plate 9 is in position. A dog 11 is mounted on the plate 9 at a point diametrically opposite the finger 10 and is adapted to be turned into and out of engagement with the shoulder 8. The lower face of the shoulder 8 is beveled, as shown in Fig. 1, and the arm 12 of the dog 11 is correspondingly beveled, so that while the cover-plate will be held tightly in place when the dog is in the position shown in Fig. 1 the dog may be readily turned into and out of its locking position. The shank 13 of the dog is integral with the head 14 of the arm 12, and the dog is seated in an aperture which is so formed that the head 14 of the dog will be flush with the top of the cover-plate 9.

In constructing the device the frame 2 and the cover-plate 9 are preferably cast, while the dog is made in the form of a straight pin having a head 14 of a desired form. The pin is then inserted into the hole 15 of the cover and is afterward forged over to form the arm 12. There is a considerable advantage in making the dog of one piece and making it of such shape that it cannot possibly become removed from the cover-plate and accidentally dropped into the manhole or otherwise lost.

In operation the plate 3 rests upon the walls of the manhole, while the wall 5 and the webs 6 are embedded into the pavement so that the top of the plate 9 is flush with the roadway. To remove the cover-plate 9, the dog 11 is turned, by means of a suitable wrench, so as to remove the arm 12 from engagement with the shoulder 8, when the plate 9 may be readily tilted upon the edge 16 to release the finger 10 from said shoulder.

For the purpose of strengthening the cover-plate 9 it is reinforced by a boss 17, surrounding the hole 15, and an annular rib 18, connecting the boss 15 and the finger 10.

It will be seen that some of the details of the construction shown may be altered without departing from the spirit of my invention. I therefore do not confine myself to such details except as hereinafter limited in the claim.

What I claim as my invention, and desire to secure by Letters Patent, is—

A manhole-cover, comprising a frame having a central aperture, and an inwardly-projecting annular shoulder on the wall of the aperture, the lower face of said shoulder being upwardly inclined, a cover-plate fitting in said aperture, a lug at one side of the cover-plate adapted to engage the lower face of said shoulder, an integral boss at the opposite side of said cover-plate and a dog rotatably mounted in said boss, said dog comprising a shank extending through said cover-plate having an integral head on its upper end and being bent laterally below said cover-plate to form an arm, said arm being adapted to engage the said inclined shoulder.

Signed at Chicago this 11th day of January, 1904.

ORIN H. DAVISON.

Witnesses:
GLEN C. STEPHENS,
EUGENE A. RUMMLER.